Dec. 23, 1924.

J. T. HENNEGAN

FLOWERPOT COVER

Filed April 26, 1924

1,520,647

INVENTOR
James T. Hennegan
By John W. Strehli
ATTORNEY.

Patented Dec. 23, 1924.

1,520,647

UNITED STATES PATENT OFFICE.

JAMES T. HENNEGAN, OF CINCINNATI, OHIO.

FLOWERPOT COVER.

Application filed April 26, 1924. Serial No. 709,103.

*To all whom it may concern:*

Be it known that I, JAMES T. HENNEGAN, a citizen of the United States, residing at the city of Cincinnati, in the county of Hamilton and State of Ohio, have invented certain new and useful Improvements in Flowerpot Covers, of which the following is a specification.

The object of my invention is to provide a simple, cheap, ornamental and protective cover for flower pots. It is well known that flower pots made of clay or earthenware naturally become dirty, discolored, and streaked, making them unsightly to behold. And flower pots of other constructions often become dusty and unclean.

The above facts especially apply to flower pots when they are sold with or without flowers planted therein.

The object of my invention is to form a cover which can be placed around said flower pots and locked in place, or can be first locked and then the flower pot placed therein, which will be ornamental and pleasing to the eye.

This cover is usually made of stiff paper but can be formed of any suitable material. These flower pot covers are usually cut out in blank form and sold to florists, to parties giving special entertainments where flowers are used, to hotels, and places where flowers are used.

Figure 2:
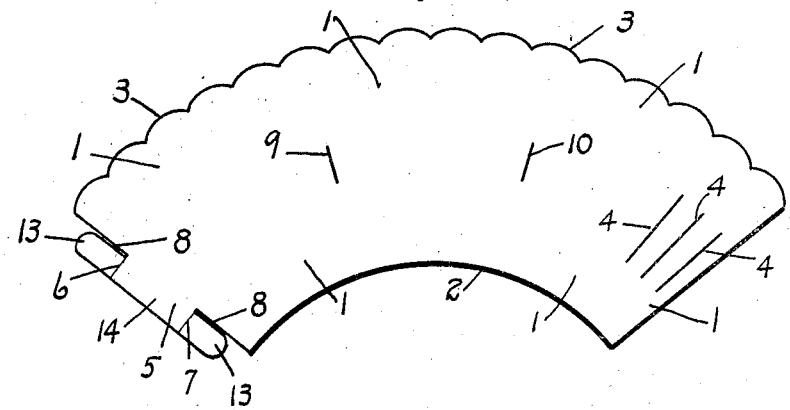
Figure 3:
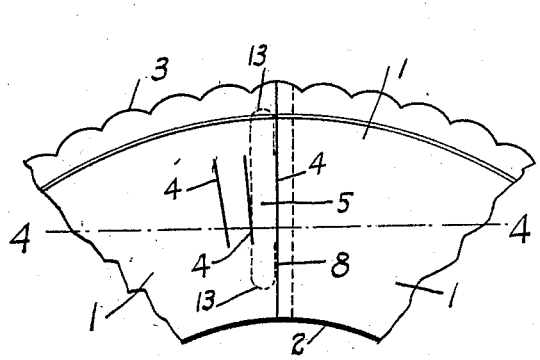
Figure 1:
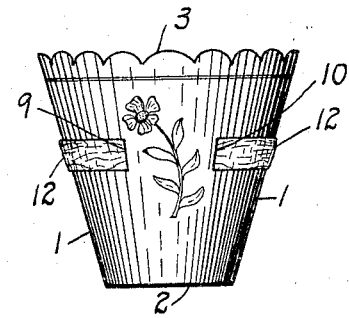
Figure 4:
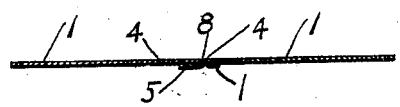

In the accompanying drawing forming a part of this specification:

Fig. 1, is a view in elevation of my new flower pot cover, formed up ready for use, Fig. 2, is a plan view of a blank from which the cover is made, Fig. 3, is a view of the back of the point formed to lock the ends together, and Fig. 4, is a section of the joint, taken on the line 4—4 of Fig. 3.

The blank from which the flower pot cover is made or formed is marked 1, and it is usually formed in the shape of a segment of a circle, or approximately so, and in the present instance, is plain at its lower edge 2, and is scalloped at the upper edge 3.

At one end of the blank, I place a series of slits or slots 4 and at the opposite side I place a locking strip or flap 5, generally rounded at its upper and lower ends, and foldable at lines 6 and 7. Between the lines 6 and 7 it is connected to the blank 1, and this forms the body part 14 of said flap. From these lines 6 and 7 at both ends the flap is slitted from the body part as shown at 8.

At points 9 and 10, I place slots or slits through which a ribbon as 12 passes, which ribbon can be tied at the back in a bow or otherwise connected, not shown. Instead of using a ribbon, I may use raffia, or any other appropriate material.

In order to make up the flower pot cover its ends are brought toward each other and then the ends 13 of the flap are first folded back on the score line 6 and 7, onto the body part 14, and then this body part 14 with the ends folded upon it, is placed through one of the slots 4 and the ends 13 are again straightened out as shown in Fig. 3, in dotted lines, and thus the blank is locked in a truncated cone form.

At this point the ribbon or raffia 12 is generally put into position, and a special ornamentation is generally placed in the space between the slits 9 and 10 where the ribbon is not visible.

The blank 1 may be highly ornamented and may be specially ornamented where occasion requires. For examples—the word "Mother" may be placed thereon for "Mother's Day"; the portrait of Washington may be placed thereon when his birthday is celebrated, and that of Lincoln on Lincoln's Day and appropriate scenery may be printed thereon for such occasions.

I used more than one slot 4 in order that the cover may be fitted to flower pots of various sizes.

While I have described one manner in which my flower pot cover can be formed and locked into position and ornamented, it will be readily understood that I may make the same of any contour or shape and lock the ends together in any appropriate way found desirable in practise, and I may also change the ornamentations,

What I claim as new and my invention and desire to secure by Letters Patent is:—

In a flower pot cover of the character described, comprising a blank for fitting over the periphery of a flower pot, provided with a locking flap at one end and engaging means at its opposite end, for engagement with said flap, to lock the cover in its place, said cover provided with slits capable of allowing a strip of raffia or ribbon to be placed therethrough and connected at its back.

In testimony whereof, I affix my signature at Cincinnati, Ohio, this 16th day of April, 1924.

JAMES T. HENNEGAN.